April 3, 1928.
R. VAN A. MILLS
1,664,800
ELECTROCHEMICAL METHOD OF AND MEANS FOR PROTECTING
BURIED PIPE LINES AGAINST CORROSION
Filed Dec. 5, 1924
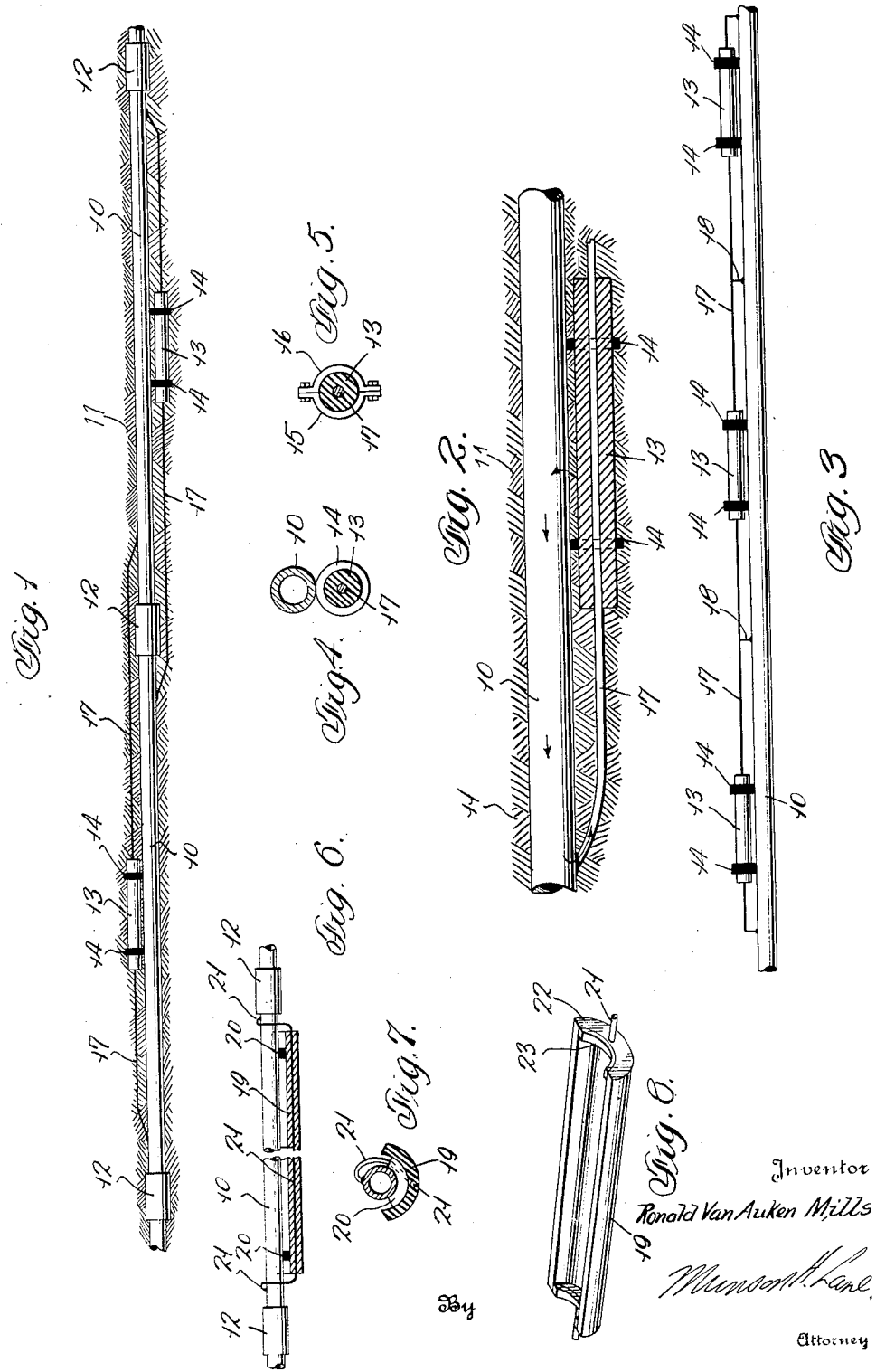
Inventor
Ronald Van Auken Mills
By Munson H. Lane
Attorney Patented Apr. 3, 1928.

1,664,800

UNITED STATES PATENT OFFICE.

RONALD VAN AUKEN MILLS, OF SANDY SPRING, MARYLAND, ASSIGNOR TO PETER Q. NYCE, OF WASHINGTON, DISTRICT OF COLUMBIA.

ELECTROCHEMICAL METHOD OF AND MEANS FOR PROTECTING BURIED PIPE LINES AGAINST CORROSION.

Application filed December 5, 1924. Serial No. 754,187.

The invention relates to an improved method of and means for protecting buried or submerged pipe lines against corrosion.

It is well known that corrosion is essentially an electro-chemical process, largely dependent upon galvanic action, and that corrosion occurs on electro-positive surfaces, that is to say, the surfaces from which an electric current leaves a metal and passes into an electrolyte, such as water and its dissolved constituents.

Corrosion of buried pipe lines is made possible by the presence of water in the ground. The present invention aims to prevent this type of corrosion.

Accordingly, I provide zinc or other metal which is electro-positive to iron, in close proximity to the pipe line, whereby the piping is rendered electro-negative with respect to the zinc or other protecting material, and corrosion then takes place on the surface of the zinc or other protecting substance instead of upon the pipe.

It is further desirable in many cases to avoid direct metallic contact between the piping and the zinc or other protecting material. The disadvantages of the direct contact are two fold. First, the protection is localized, only the surface in the immediate vicinity of the zinc being protected. Secondly, short circuiting or contact action takes place between the piping and the zinc, which gives rise to rapid consumption of the zinc.

According to the present invention, I eliminate these disadvantages by placing the zinc in close proximity to, but not in direct contact with, the pipe line and also by providing non-conducting spacers between the electro-positive protecting material and the pipe line. An electric circuit between the pipe and the protecting material is completed by connecting the zinc to the pipe line by means of suitable conductors or bonds, which may be wires or metal rods. The bonds may be welded or clamped to the pipe.

The invention will be more readily understood by reference to the accompanying drawings in which:

Fig. 1 is a plan view representing a horizontal pipe line buried beneath the earth and provided with electro-positive protecting devices located at intervals along the length of the piping.

Fig. 2 is a detail view partly in plan and partly in longitudinal section, showing one of the protecting devices of the type shown in Fig. 1.

Fig. 3 is a plan view similar to Fig. 1 showing a number of the protecting devices placed at intervals along a single conductor, which is parallel to the line of pipe and connected to the pipe at intervals by suitable bonds.

Fig. 4 is a detail cross-sectional view through one of the protecting devices illustrated in Figs. 1, 2 and 3, showing one of the spacing devices in elevation.

Fig. 5 is a detail similar to Fig. 4 but showing a removable spacer.

Fig. 6 is a view partly in side elevation and partly in longitudinal section, showing a portion of pipe line having a trough-shaped protecting device located beneath the pipe line and separated therefrom by suitable spacers.

Fig. 7 is a cross-sectional view of the same, and

Fig. 8 is a perspective view showing a further modification of the protecting device, which is trough-shaped as is Fig. 6, but is provided with integral end members upon which the piping rests.

Referring first to Figs. 1, 2 and 4, the reference numeral 10 represents a horizontal pipe line, ordinarily composed of iron or steel, which is buried in the earth 11, and is provided with the usual collars 12 at junctures of the successive lengths of piping.

In order to prevent corrosion of the piping, protecting elements 13, composed of material which is electro-positive with respect to the piping, are located at intervals along the pipe line. These protecting elements 13 are composed preferably of zinc, though any metal which is electro-positive with respect to the piping may be used. As shown in Figs. 1, 2, 3, 4 and 5, these elements are in the form of solid cylinders or short rods though other forms may be used if desired.

In order to prevent short circuiting between the rods 13 and the pipe line, I preferably provide non-conducting devices 14 which may be in the form of collars or rings surrounding the electro-positive elements 13, or may be formed in two parts 15, 16, as shown in Fig. 5, or may be in the form of blocks or other convenient form. These non-conducting collars may be of any suitable material, as terra cotta, porcelain, bakelite, or the like.

An electrical circuit is completed by means of suitable conductors 17, which may, if desired, be cast within the electro-positive elements 13, and secured at their ends to the pipe line 10 in any suitable manner, as by spot welding or clamping.

In Fig. 3 a single conductor 17 is used, which extends parallel to the pipe line 10 and is provided with a plurality of protecting devices 13 located at spaced intervals. The conductor is connected to the pipe line by means of suitable bonds 18.

In Figs. 6 and 7, is shown a modified protecting device which is adapted to be placed beneath the pipe line 10, and is preferably in the form of a trough 19 which is separated from the pipe line by means of suitable insulating spacers 20, and electrically connected to the piping by means of suitable conductors 21. The advantage of this type of device is that moisture will collect in the troughs 19, thus providing an electrolyte which promotes galvanic action. In the forms previously described the moisture normally present in the earth must be relied upon. In some cases there is sufficient moisture at certain parts of the pipe line to produce corrosion but not sufficient moisture at the points where the protecting devices are located to produce the galvanic circuit which is necessary to the operation of the device. In such cases the trough-shaped members should be used in preference to the rod-shaped form previously described.

In Fig. 8 a still further modification is shown in which the trough 19 is provided with raised ends 22 which increase the holding capacity of the trough and further insure galvanic action between the pipe to be protected and the electro-positive protecting devices. According to this modification spacing devices 23 are interposed between the ends 22 of the trough and the pipe itself.

The protective action of the electro-positive elements will be evident from the foregoing description. The presence of corrosive liquids in the earth produces galvanic action as shown in Fig. 2. An electric current flows from the electro-positive surfaces of the protecting elements 13 in the direction of the arrows to the electro-negative surface of the pipe line, along which it flows, the circuit being completed by means of the conductor 17. The operation is the same in the other forms of the device shown.

In this manner only the electro-positive elements are corroded, the pipe line being protected. Eventually the protective devices will have to be replaced, but this can be done at a very small cost as compared with the expense involved in replacing an entire pipe line.

To replace the protecting elements, it is only necessary to provide terra cotta or other piping leading from the surface down to the original protecting elements, said piping being of sufficient diameter to allow a new protecting element to pass down and rest in contact with the original protecting element or the conductor to which the original element was secured.

The invention has been described in considerable detail for the purpose of illustration, but many further modifications will be evident to one skilled in the art, without departing from the spirit of the invention.

For example, rings or sleeves of zinc surrounding the piping but spaced therefrom, may be provided, such rings being located at spaced intervals along the length of the piping, and connected thereto by means of suitable conductors.

I claim—

1. A device for protecting buried iron or steel piping against corrosion, comprising a zinc protecting element buried within the earth in intimate contact therewith and in close proximity to said piping, but spaced therefrom by means of non-conducting spacers, and conductors for completing an electric circuit to said piping at a distance from the protecting element.

2. An electro-chemical method of protecting buried piping against corrosion, which consists in applying a metal electropositive to the piping on the outside of the piping and in intimate contact with the earth, spacing the electro-positive metal away from direct contact with the piping and electrically connecting the electro-positive metal to the piping at a substantial distance therefrom.

In testimony whereof I affix my signature.

RONALD VAN AUKEN MILLS.